(12) United States Patent
Parthasarathy

(10) Patent No.: US 6,275,611 B1
(45) Date of Patent: *Aug. 14, 2001

(54) HANDWRITING RECOGNITION DEVICE, METHOD AND ALPHABET, WITH STROKES GROUPED INTO STROKE SUB-STRUCTURES

(75) Inventor: Kannan Parthasarathy, Palo Alto, CA (US)

(73) Assignee: Motorola, Inc., Schaumburg, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/732,957

(22) Filed: Oct. 17, 1996

(51) Int. Cl.[7] ..................................................... G06K 9/00
(52) U.S. Cl. ......................... 382/187; 382/200; 382/202; 382/225
(58) Field of Search ..................................... 382/185, 186, 382/187, 188, 189, 190, 191, 197, 200, 202, 209, 213, 214, 215, 220, 225, 228, 229, 231, 288; 345/173, 175

(56) References Cited

U.S. PATENT DOCUMENTS

| | | | |
|---|---|---|---|
| 4,561,105 | * 12/1985 | Crane et al. | 382/13 |
| 4,972,496 | 11/1990 | Sklarew | 382/13 |
| 5,579,408 | * 11/1996 | Sakaguchi et al. | 382/187 |
| 5,615,285 | * 3/1997 | Beernizk | 382/189 |
| 5,644,648 | * 7/1997 | Bose et al. | 382/177 |
| 5,644,652 | * 7/1997 | Bellegarda et al. | 382/187 |
| 5,737,593 | * 4/1998 | Agrawal et al. | 382/187 |
| 5,740,273 | * 4/1998 | Parthsarathm et al. | 382/187 |
| 5,956,433 | * 9/1999 | Sasaki | 380/275 |
| 5,970,170 | * 10/1999 | Kuclashevich et al. | 382/187 |

FOREIGN PATENT DOCUMENTS

| | | | |
|---|---|---|---|
| 0 538038 | 4/1993 | (EP) | G06K/9/00 |
| 2227867A | 8/1990 | (GB) | G06K/9/78 |

OTHER PUBLICATIONS

IEEE Proceedings of ICPR 1996; "Robust and Highly Customizable Recognition of On–Line Handwritten Japanese Characters", by Nakagawa et al; pp. 269–273.

IEEE Proceedings of the Third International Conference on Document Analysis and Recognition, Aug. 14–16, 1995, Montreal, Canada. "On–line Recognition of Run–on Korean Characters", Pyeoung Kee Kim et al., pp. 54–57.

* cited by examiner

*Primary Examiner*—Matthew C. Bella
(74) *Attorney, Agent, or Firm*—Jay Ray Wood; Romi N. Boxe; Hisashi D. Watanabe

(57) ABSTRACT

A method of representing handwriting which includes receiving a pen input, for example at a digitizer (10), segmenting the input into strokes (13), grouping the strokes into stroke sub-structures (14) and quantizing the stroke sub-structures according to a predefined set (the "alphabet") of stroke sub-structures. For handwriting recognition, distance measurements are computed between the input stroke sub-structures and members of a predefined set or "alphabet" (19) of stroke sub-structures.

18 Claims, 9 Drawing Sheets

|   (A1)   |   (A2)   |   (A3)   |   (A4)   |
|----------|----------|----------|----------|
|   (A5)   |   (A6)   |   (A7)   |   (A8)   |
|   (A9)   |   (A10)  |   (A11)  |   (A12)  |
|   (A13)  |   (A14)  |   (A15)  |   (A16)  |

*FIG.6*

|   (A33)  |   (A34)  |   (A35)  |   (A36)  |
|----------|----------|----------|----------|
|   (A37)  |   (A38)  |   (A39)  |   (A40)  |
|   (A41)  |   (A42)  |   (A43)  |   (A44)  |
|   (A45)  |   (A46)  |   (A47)  |   (A48)  |

*FIG.7*

HANDWRITING RECOGNITION DEVICE, METHOD AND ALPHABET, WITH STROKES GROUPED INTO STROKE SUB-STRUCTURES

FIELD OF THE INVENTION

This invention relates to handwriting recognition and handwriting representation, for example for use with Chinese handwriting.

BACKGROUND OF THE INVENTION

There is a long-felt need for an automated way of recognizing hieroglyphic based written languages such as Chinese, Japanese, Korean and other languages.

There are several thousand characters in the Chinese language. For example, there are nearly 7000 Chinese characters supported by the GB coding standard used in China, and about 13000 Chinese characters supported by the Big5 coding standard used in Taiwan and Hong Kong. Some words in Chinese have just one character in them, while the majority of words have two or more characters. The average number of characters in a word is about 2.5. The large number of characters makes the design of a Chinese handwriting recognition system a difficult one. Previous research has considered breaking down handwritten Chinese characters into sub-structures. These sub-structures then constitute an alphabet for handwritten Chinese, and all handwritten Chinese characters can be expressed using this alphabet. A known choice for sub-structures in Chinese characters is the set of radicals used in a Chinese dictionary. Radicals are of limited use as sub-structures when it comes to Chinese handwriting recognition, due to the relatively large number of them (there are between 500 and 600 radicals), and the difficulty in machine extraction of radicals from a handwritten input. Similar problems exist in recognizing writing in other languages.

A popular paradigm for character recognition of handwritten Chinese input is to store one or more templates for each character of interest and using a nearest neighbor classifier to find the identify of the handwritten input. A nearest neighbor classifier is one that simply finds the nearest or best matching template and reports the identity of that template as the identity of the handwritten input. Since the Chinese language has several thousands of characters, this paradigm requires a relatively large amount of memory to store the templates for all the characters.

There is a need for a better alphabet for a handwritten language, with handwriting recognition in mind, and a need for an improved method of handwriting recognition.

BRIEF DESCRIPTION OF THE DRAWINGS

FIGS. 6 and 7 are illustrations of symbols of the alphabet according to a preferred embodiment of the present invention with one and two stokes per symbol respectively.

DETAILED DESCRIPTION OF THE DRAWINGS

A preferred method of providing an alphabet of sub-strokes for handwriting recognition is now described by way of example. The method comprises collecting pen input, segmenting the pen input into strokes and stroke sub-structures, establishing an alphabet size and clustering the strokes and stroke sub-structures into a first set of strokes and at least a second set of stoke sub-structures, where the total number of elements in the sets is not greater than the alphabet size. The method preferably also other steps such as averaging across samples in a cluster, generating cluster centers and storing the cluster centers in terms of parameters defining the cluster centers.

By the method described, a new alphabet set is derived automatically through a training procedure using real Chinese or other handwriting data. The alphabet set is useful for representing and storing handwritten Chinese characters.

Users are not expected to use the new artificial alphabet while writing Chinese characters. This aspect of the new alphabet contrasts with artificial alphabets known for the English language, such as the Graffiti™ alpabet. The alphabet is used to store handwritten input in a compact form for later use, for instance, by a character recognition system.

Accordingly, a method of representing handwriting is also provided comprising: receiving a pen input; segmenting the input into strokes; grouping the strokes into stroke sub-structures; and quantizing the stroke sub-structures according to a predefined set (the "alphabet") of stroke sub-structures.

Also a method of handwriting recognition is provided comprising: receiving a pen input; segmenting the input into strokes; grouping the strokes into input stroke sub-structures; and computing distance measurements between the input stroke sub-structures and members of a predefined set of strokes and primitive stroke sub-structures. A primitive stroke sub-structure is a group of strokes which is artificial or has no meaning.

Further preferred details of the method of handwriting recognition are described below. The new method of handwriting recognition has great advantages of speed over existing methods of handwriting recognition, as well as memory requirement and performance (accuracy of recognition) for given processing power and memory size. It is therefore highly suited to consumer products.

Moreover, the method of handwriting recognition is independent of the actual alphabet used. The chosen alphabet can be optimized for many Chinese writers or for a region of writers or even a single writer, or an alphabet can be created for Japanese handwriting recognition or Korean handwriting recognition or even English or almost any other expression of handwriting recognition based on the same principles.

Figure 1:
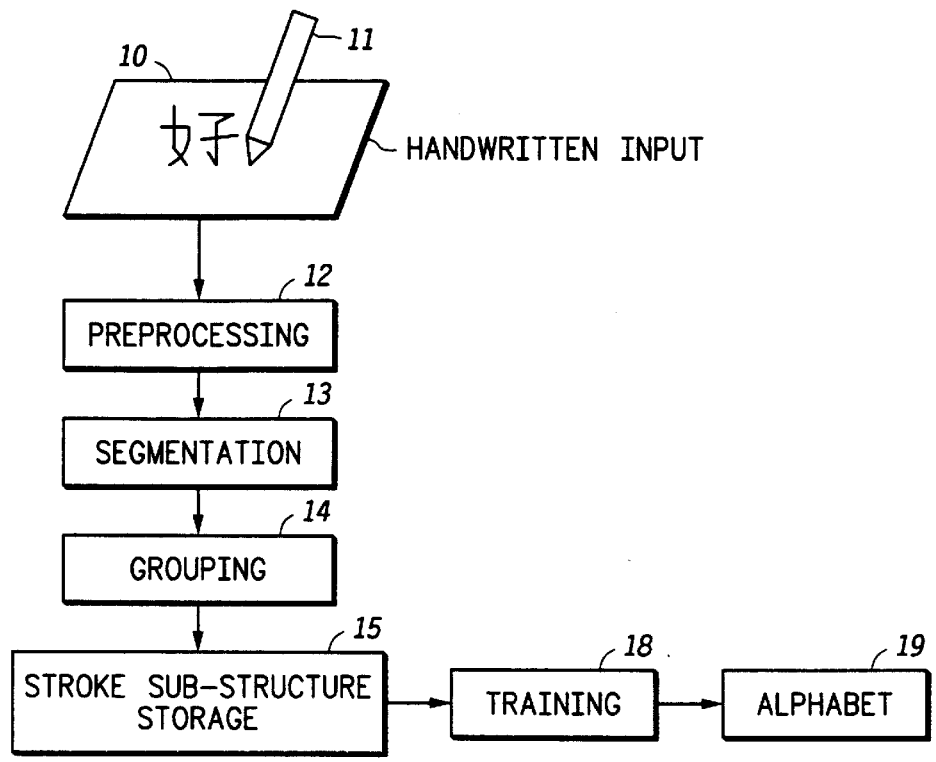
FIG. 1 is a flow diagram of a training process for deriving an alphabet in accordance with a preferred embodiment of the invention.

A process for deriving an alphabet for handwritten Chinese is first described. Referring to FIG. 1, an overview of a training process for deriving an alphabet for handwritten Chinese is illustrated.

Handwritten input is collected using a digitizing tablet 10 and a pen 11 (which in general is no more than a stylus). X and Y coordinates from the digitizer 10 are provided to a microprocessor in a manner known in the art. In the microprocessor (not shown in FIG. 1) the input from the digitizer is sent to a preprocessing module 12. The preprocessor breaks down the handwriting input into a sequence of "strokes". A segmentation module 13 then segments the sequence of strokes and a grouping module 14 groups the strokes into smaller units, called stroke sub-structures, using a pre-defined deterministic rule. Handwritten input is collected for all characters of interest in the Chinese language, from a large number of writers, and the stroke sub-structures are stored in a storage device 15, which can be any form of suitable memory. In a training step 18, the stored stroke sub-structures are used to derive an alphabet 19. The size of the alphabet is decided apriori. A known clustering technique is used to generate the alphabet of the required size.

Further details of the processing used in deriving an alphabet for handwritten Chinese characters is as follows. Referring to FIG. 1, the preprocessing module 12 breaks down the handwritten input into a sequence of strokes by approximating the input by using piece-wise linear segments. A stroke here is defined to be a straight line segment. The exact method used to get the piece-wise linear approximation of the handwritten input is not relevant here. For further details, reference can be made to U.S. Pat. No. 5,740,273 of Parthasarathy et al., which is incorporated herein by reference. The major steps in preprocessing are: (a) handwritten input is smoothed using a filter to remove jitters; (b) the smoothed input is scaled to fit in a standard size box; (c) the start point and end point of continuous pen down segments of "ink" are selected; (d) points where the local angle change is a local maxima and exceeds a set threshold are also selected (this step essentially selects all the significant "bends" in the handwritten input); and straight lines are drawn between consecutive points selected in steps (c) and (d) above. This sequence of straight line segments are the strokes produced by the preprocessor.

Figure 2:
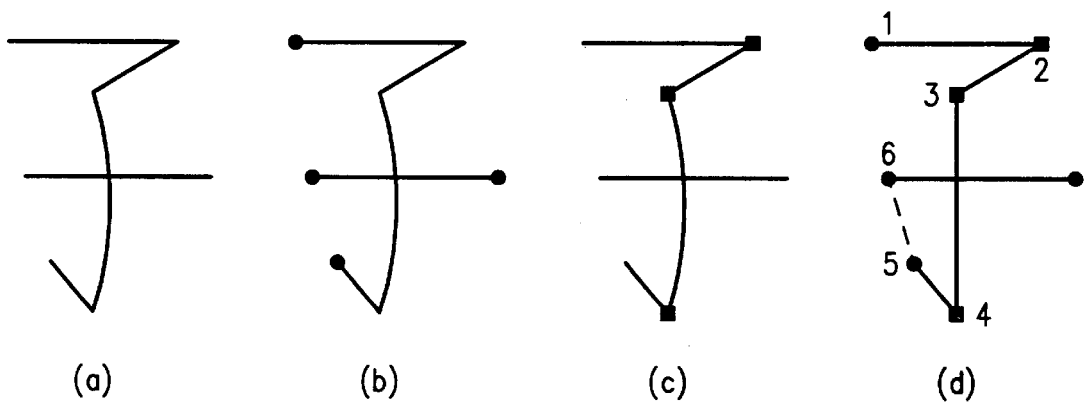
FIG. 2 is an illustration of a pen input undergoing preprocessing steps.

FIG. 2 illustrates illustrates the preprocessing steps. Part (a) of the figure shows a handwritten Chinese character. The filled circles in part (b) of the figure show the start points and end points of continuous pen down segments of ink, whereas the filled squares in part (c) show the points where the local angle change are a local maxima and exceed a threshold. Part (d) shows the result of preprocessing, which is a sequence of six straight line segments joining the points shown in parts (b) and (c) of the figure. The term "stroke" is used here to refer to a straight line segment. Note that the stroke marked 5 in FIG. 2(*d*) is shown using a dotted line. A dotted line has been used to highlight the fact that stroke 5 has been artificially introduced during preprocessing. Stroke 5 in FIG. 2(*d*) reflects a pen motion, and does not corresponds to any real ink in the original handwritten input. After preprocessing, no distinction is made between real strokes (i.e. those really corresponding to the handwritten input) and artificial strokes (i.e. those artificially introduced during preprocessing). By treating real and artificial strokes as being equal, cursive forms of writing can be handled in the same way as print forms of writing. The character shown in FIG. 2 can equally be written as a single ink segment without lifting the pen between points 5 and 6. The final set of strokes produced after preprocessing is the same whether the character is printed (i.e. has pen-up segments) or is written cursively.

The preprocessing module or step 12 breaks down any handwritten input into a sequence of strokes, where a stroke is simply a straight line segment. In the segmentation module or step 13, the strokes are separated into groups using a simple rule as follows.

To begin with, the maximum number of line segments that any symbol in the alphabet can have, denoted $N_{LS\_MAX}$, must be decided. Any symbol in the alphabet will itself be a sequence of straight line segments. A particular choice of $N_{LS\_MAX}$ dictates that the number of line segments in the symbols of the alphabet ranges between 1 and $N_{LS\_MAX}$. The choice of $N_{LS\_MAX}$ is based on the following considerations. If $N_{LS\_MAX}$ is large, the number of symbols of the alphabet needed to represent any handwritten input will be small, which is very desirable. However, a large value of $N_{LS\_MAX}$ will result in more approximation error in representing the handwritten input using the symbols of the alphabet. Note that the representation of the handwritten input using the symbols of the alphabet is only an approximation of the handwritten input. It has been found that values of $N_{LS\_MAX}$ between 2 and 4 are satisfactory. For the sake of simplicity and ease of discussion, the following explanation will use the example where $N_{LS\_MAX}=2$.

Figure 3:
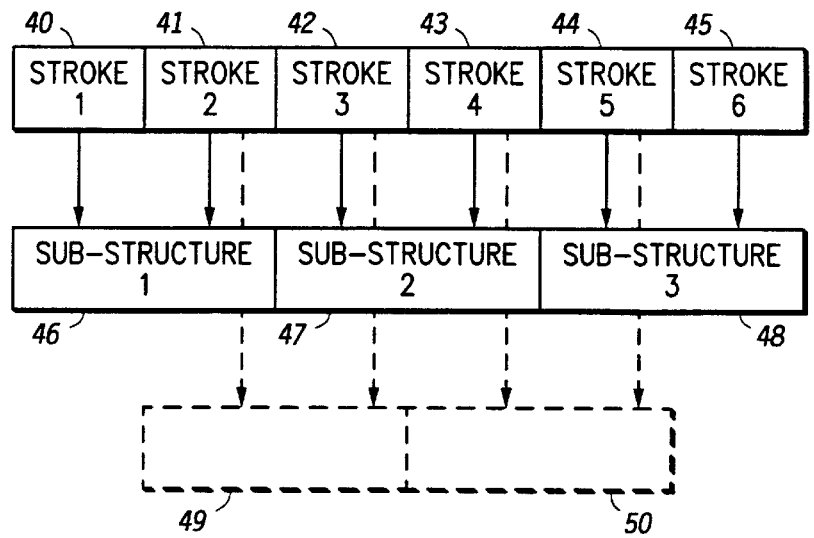
FIGS. 3 and 4 are examples of groupings of stokes into sub-structures.

FIG. 3 illustrates the process of grouping strokes into stroke sub-structures. In FIG. 3, it is assumed that the handwritten input has been preprocessed into six strokes 40–45 by the segmentation module 13. In such a case, three stroke sub-structures are extracted 46–48. Every two consecutive strokes (every $N_{LS\_MAX}$ consecutive strokes when $N_{LS\_MAX}$ is not 2) are grouped together in grouping module 14 into a single stroke sub-structure, e.g. strokes 40 and 41 are grouped into sub-structure 46. Thus, strokes 40 and 41 are grouped into stroke sub-structure 46, strokes 42 and 43 are grouped into stroke sub-structure 47, and strokes 44 and 45 are grouped into stroke sub-structure 48. Alternative groupings 49 and 50 are illustrated in phantom outline and are discussed below.

Figure 4:
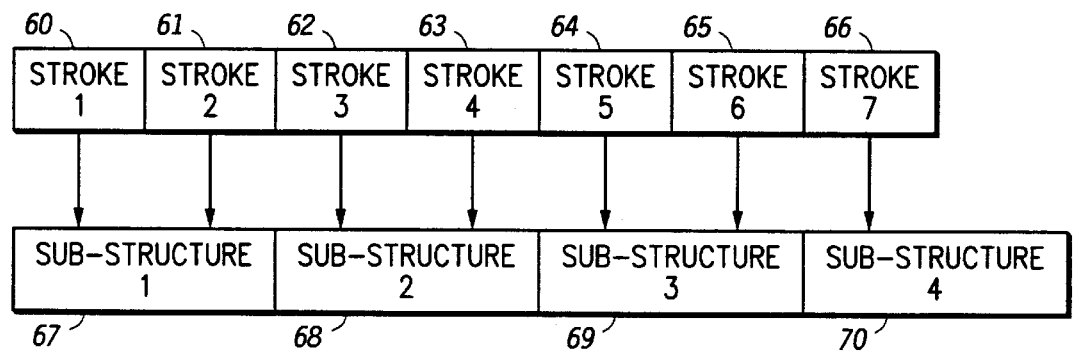

By doing the operation described, the last stroke sub-structure can have less than two strokes. In FIG. 4, the case is illustrated where the handwritten input has been preprocessed into seven strokes. In this case four stroke sub-structures are extracted, and the last stroke sub-structure 70 has only one stroke in it (stroke 66).

Figure 5:
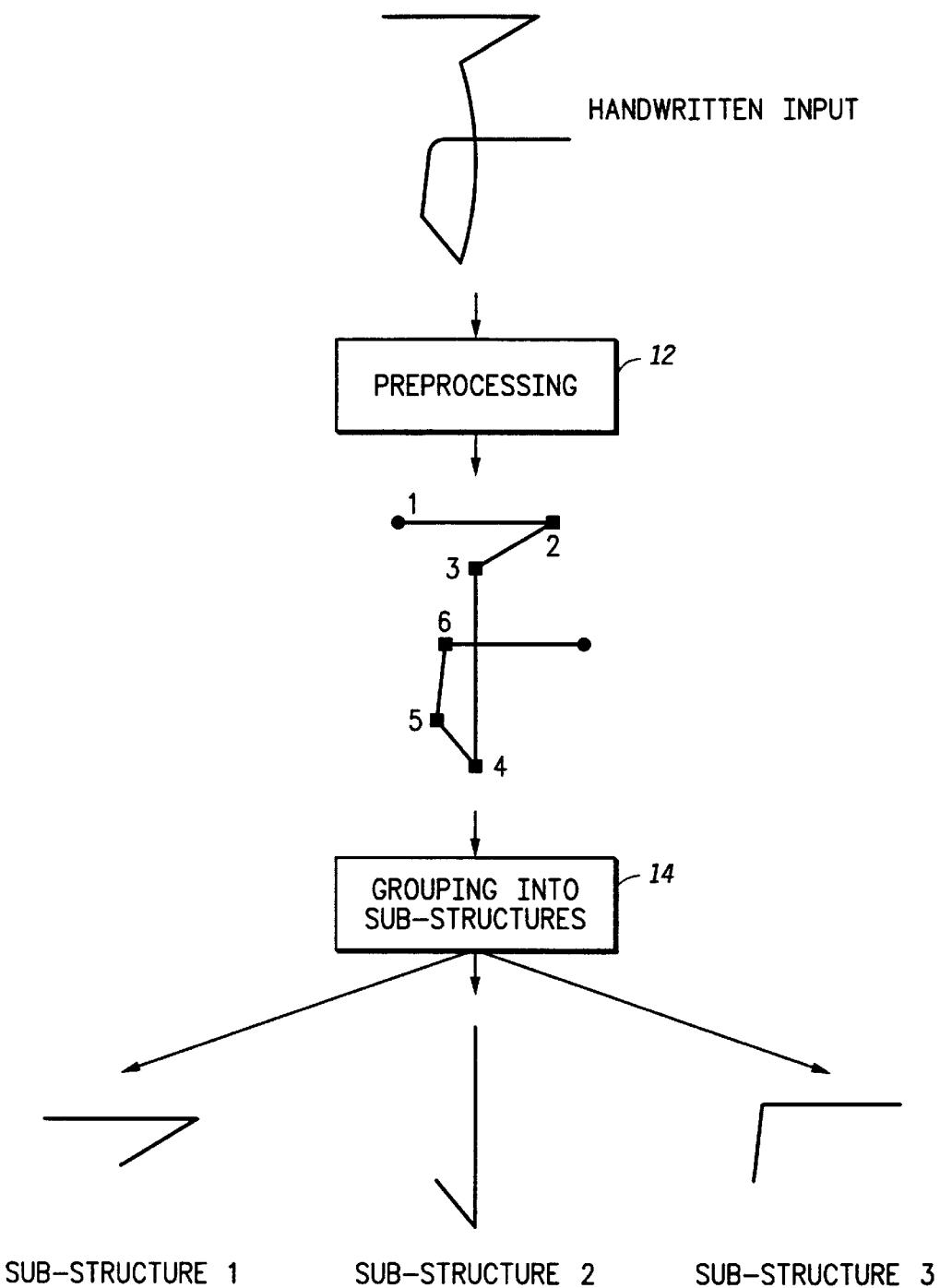
FIG. 5 is an illustration of certain steps of FIG. 2 illustrating a specific example of extracting of stroke sub-structures.

A more specific example of extracting stroke sub-structures from handwritten input is shown in FIG. 5. The handwritten input in FIG. 5 is preprocessed into six strokes. The six strokes in turn are segmented into three stroke sub-structures.

Having now described the preprocessing steps, the training process 18 is described in more detail. Handwritten input for all characters of interest in the Chinese language is collected from a large number of writers and stroke sub-structures for each one of the character samples are extracted and stored in a storage device 15. These stored stroke sub-structures are then used to derive an alphabet 19 for representing handwritten Chinese input.

The first step in the training process to derive the alphabet is to decide the size of the alphabet. The size of the alphabet is simply the number of distinct symbols in the alphabet. An alphabet size of 256 has been found to be convenient and efficient, as a single byte (8 bits) can be used to represent any symbol in the alphabet. However, any size can be used in theory.

The symbols in the alphabet are obtained by using a clustering technique on the stored stroke sub-structures extracted from real handwritten input. The K-means clustering technique described in R. O. Duda, P. E. Hart, "Pattern Classification and Scene Analysis", John Wiley & Sons, 1973 is highly suitable, but other clustering techniques may also be used to produce similar results.

In order to use the K-means clustering technique, the stroke sub-structures must be parametrized in a suitable fashion. A stroke sub-structure is a sequence of strokes, where a stroke is a straight line segment. Each straight line segment is represented using two quantities: a length and an angle with respect to some reference. Thus, a stroke sub-structure can be represented as a sequence of length and angle pairs. Note that by using only length and angle to represent a straight line, the description of stroke sub-structures translation has been made invariant (i.e. independent of location of the stroke sub-structure within the character). A stroke sub-structure with n strokes can be represented by the 2n dimensional vector $[l_1,\theta_1; l_2,\theta_2; \ldots; l_n,\theta_n]$, where $l_i$ and $q_i$ are the length and angle, respectively, of the ith line segment of the stroke sub-structure.

When $N_{LS\_MAX}$ is two, all the symbols in the alphabet have either one stroke or two strokes. During the training process 18, the stored stroke-sub-structures are separated out into those that have one stroke and those that have two strokes, and clustering is performed on the two sets separately. Thus, K-means clustering is performed on the stored stroke sub-structures with only one stroke to give symbols of the alphabet with one stroke, and, similarly, stored stroke sub-structures with two strokes generate symbols of the alphabet with two strokes.

No modifications need be made to the general K-means clustering algorithm. Initially, all samples are randomly assigned to clusters, and the mean of each cluster is found by averaging across all samples in a cluster. During each epoch or cycle of the clustering process, all samples are tested sequentially to determine if they need to be reassigned to a new cluster. The reassignment of a sample is done by computing distances between the sample and each of the cluster centers and choosing the cluster center that has the least distance to the sample. The distance between a sample with feature vector $[l_1,\theta_1; l_2,\theta_2; \ldots; l_n,\theta_n]$ and a cluster center with feature vector $[l^c_1,\theta^c_1; l^c_2,\theta^c_2; \ldots l^c_n, \theta^c_n]$ is a weighted manhattan distance defined as $$d = \sum_{i=1}^{n} w_l |l^{c_i} - l_i| + w_\theta |\theta^{c_i} - \theta_i| \qquad (EQ\ 1)$$

where $w_l$ and $w_\theta$ are the weights for stroke length and stroke angle respectively. From a character recognition viewpoint, stroke angles are more reliable features to use when compared with stroke lengths. Values of $w_l=1$ and $w_\theta=4$ are suitable. At the end of an epoch (i.e. all samples have been tested and reassigned to new clusters whenever possible), new cluster centers are computed by averaging across all samples in a cluster, and a new clustering epoch is started. Clustering is terminated when the number of samples that get reassigned to new clusters in an entire epoch, is zero.

Samples from an alphabet derived using the algorithm discussed are illustrated in FIGS. 6 and 7. The first 16 of 32 symbols of the alphabet which have only one stroke are shown in FIG. 6. There are 32 symbols in the alphabet which have only one stroke. In FIG. 6, the start of a stroke is highlighted by using a small circle, and this unambiguously shows the direction of writing the stroke. The first 16 of 224 symbols of the alphabet with two strokes are shown in FIG. 7. The order of the symbols shown in FIGS. 6 and 7 is random. This means that symbol (A1) in FIG. 6 has the same importance as any of the other symbols shown in FIG. 6.

The handwritten Chinese character data that was used to derive the alphabet was obtained as follows. First, handwritten samples for 6763 simplified Chinese characters and 13052 traditional Chinese characters were collected from a large number of writers. For each character, a statistical analysis was performed to extract a small subset of samples that captured the variations in writing that character. Variations in writing style include shape variations and stroke order variations. An alphabet for representing handwritten Chinese characters was derived using the above mentioned subset of handwritten Chinese characters that were collected. The maximum number of line segments that any symbol in the alphabet can have, denoted $N_{LS\_MAX}$, was set to two. Thus, all the symbols in the "alphabet" have either one or two strokes. A stroke here means a straight line segment. The number of symbols in the alphabet with one stroke was set to 32, and the number of symbols in the alphabet with two strokes was set to 224. The total number of symbols in the alphabet is thus 256, and a single byte can be used to represent any symbol of the alphabet.

It will be appreciated that the exact symbols used in the alphabet are of no consequence. Analysis of different samples will give different alphabets. For this reason, all 256 symbols are not illustrated, FIGS. 6 and 7 illustrating a representative sample.

Table 1 shows the actual stroke parameters, namely stroke length and stroke angle, for all the symbols in FIG. 6.

TABLE 1

Stroke parameters for symbols with one stroke

| Symbol | Angle | Length |
|--------|-------|--------|
| A1 | 34 | 27 |
| A2 | 25 | 62 |
| A3 | 24 | 23 |
| A4 | 249 | 39 |
| A5 | 0 | 50 |
| A6 | 224 | 26 |
| A7 | 246 | 72 |
| A8 | 14 | 27 |
| A9 | 5 | 17 |
| A10 | 242 | 20 |
| A11 | 253 | 18 |
| A12 | 10 | 97 |
| A13 | 64 | 118 |
| A14 | 79 | 44 |
| A15 | 66 | 156 |
| A16 | 120 | 21 |

Handwritten input is scaled during preprocessing to fit in a standard box of size 180×180. This scaling assures that the length of the longest straight line that can be drawn, namely the diagonal of the square box, is less than 255. Angles are shown as numbers between 0 and 255 (uniformly quantized), where 0 refers to 0 degrees and 256 refers to 360 degrees. Table 2 shows the actual stroke parameters for the symbols of the alphabet illustrated in FIG. 7.

TABLE 2

Symbols of the alphabet with two strokes

| Symbol | Angle 1 | Length 1 | Angle 2 | Length 2 |
|--------|---------|----------|---------|----------|
| A33 | 248 | 39 | 64 | 81 |
| A34 | 101 | 39 | 252 | 32 |
| A35 | 172 | 51 | 68 | 44 |
| A36 | 215 | 33 | 22 | 33 |
| A37 | 27 | 17 | 80 | 46 |
| A38 | 53 | 19 | 232 | 35 |

TABLE 2-continued

Symbols of the alphabet with two strokes

| Symbol | Angle 1 | Length 1 | Angle 2 | Length 2 |
|---|---|---|---|---|
| A39 | 206 | 112 | 246 | 43 |
| A40 | 104 | 36 | 85 | 46 |
| A41 | 7 | 143 | 169 | 165 |
| A42 | 68 | 82 | 225 | 35 |
| A43 | 14 | 16 | 70 | 54 |
| A44 | 225 | 41 | 242 | 37 |
| A45 | 153 | 45 | 244 | 35 |
| A46 | 85 | 25 | 105 | 49 |
| A47 | 248 | 45 | 186 | 91 |
| A48 | 84 | 119 | 220 | 68 |

Quantization of length and angle is uniformly distributed, however this need not be the case. In particular, in Chinese, most strokes are either up-down or side-to-side and it is advantageous to provide greater resolution of angle in these directions at the expense of less resolution along the diagonal directions.

Figure 8:
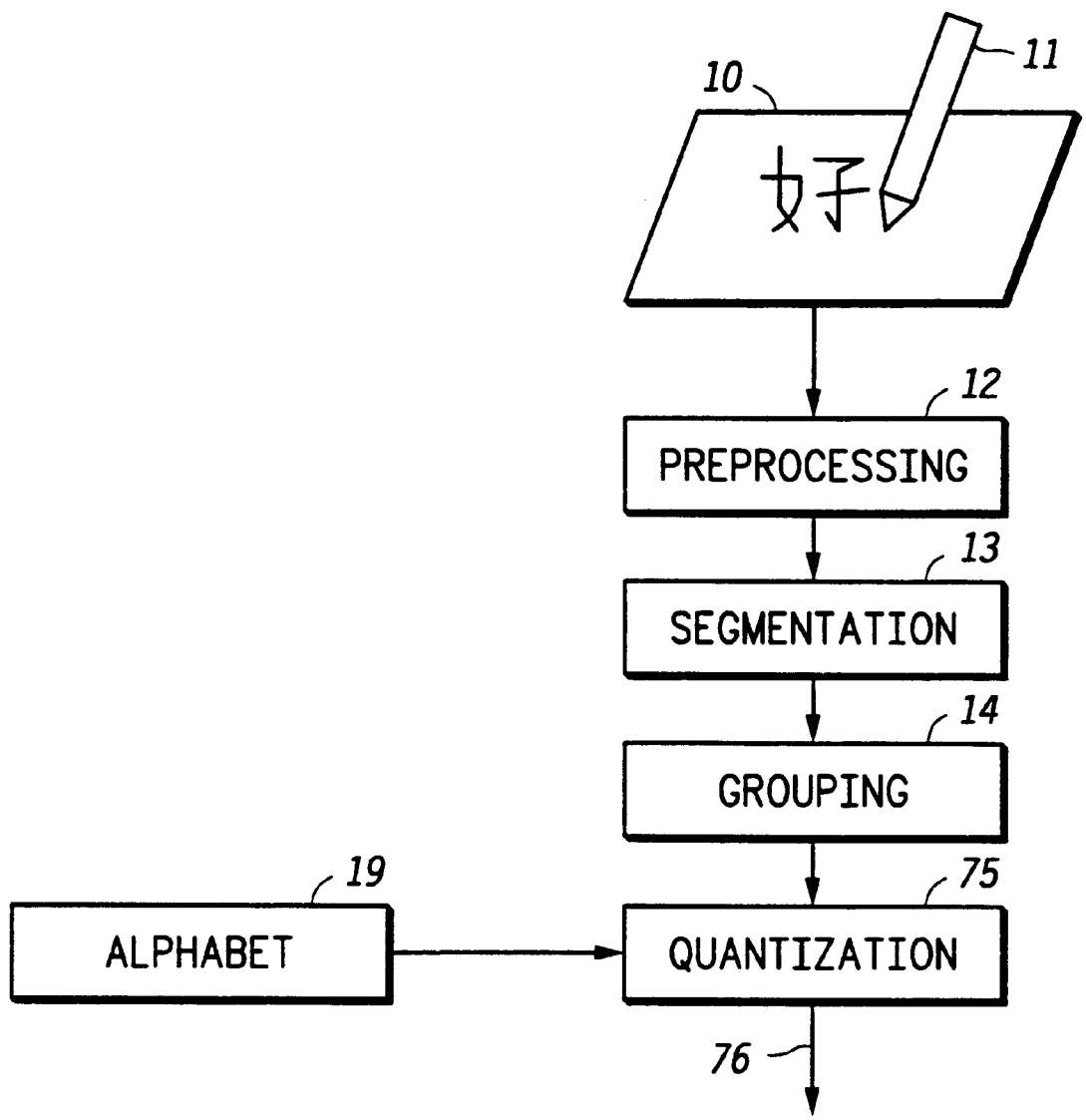
FIG. 8 is a flow diagram illustrating a method of handwriting representation.

A block diagram showing the steps in deriving the representation of a handwritten Chinese character in terms of the derived alphabet is shown in FIG. 8. The process for representing any handwritten Chinese character input using the derived alphabet shares many of the steps that are needed to derive the alphabet itself. In addition, a quantization step 75 shown in FIG. 8, each stroke sub-structure that has been segmented out is compared to all the elements (symbols) of the alphabet 19 and the element (symbol) that best approximates the extracted stroke sub-structure is selected. Thus, after each stroke sub-structure has been quantized to the nearest element of the alphabet, the handwritten input can be represented as a string of symbols at the output 76 of the quantizer, that are elements of the derived alphabet.

Figure 9:
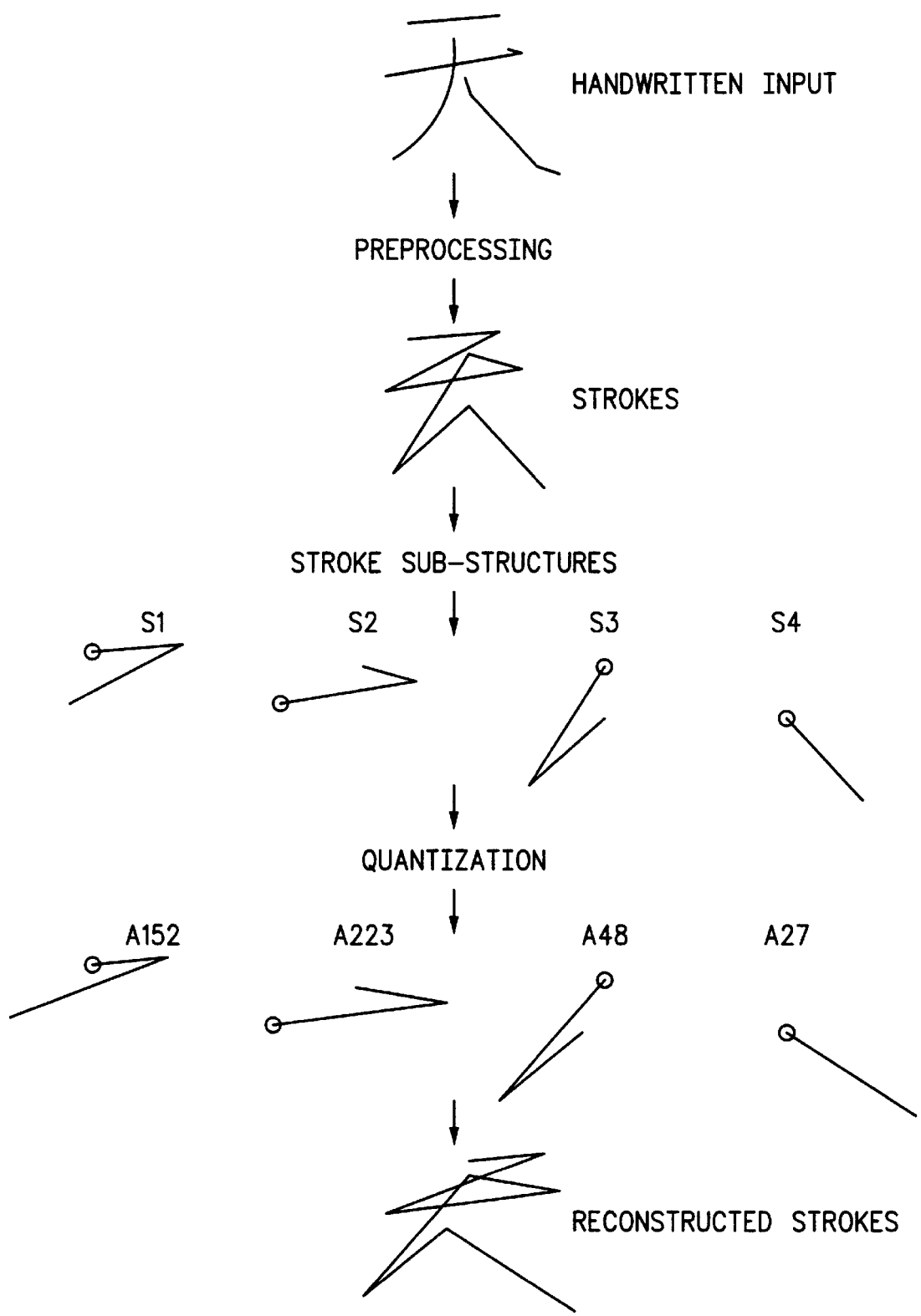
FIG. 9 is an illustration of a handwritten character undergoing processing steps of FIG. 8.

By way of example, the handwritten input uppermost in FIG. 9 is broken down into seven straight line segments or strokes after preprocessing. In the segmentation step 13, every two contiguous strokes are grouped together into separate stroke sub-structures. Since there are seven strokes, the segmentation step gives rise to four stroke sub-structures S1, S2, S3, and S4. Stroke sub-structures S1, S2, and S3 each have two strokes. Stroke sub-structure S4 has only one stroke. In the quantization step 75, each stroke sub-structure is approximated by a symbol of the alphabet. The approximation is based on the same distance metric given in Equation 1 above. Stroke sub-structures S1, S2, S3 and S4 are approximated by the symbols of the alphabet A152, A223, A48 and A27, respectively. Thus the handwritten input shown in the top portion of FIG. 9 can be compactly represented by the string {A152, A223, A48, A27}. Since there are only 256 symbols in the alphabet, a single byte is needed to code each symbol of the derived alphabet and the handwritten input shown in FIG. 9 can be represented using only four bytes.

In the bottom of FIG. 9, the symbols A152, A223, A48, and A27 are concatenated and drawn to reconstruct the strokes in the handwritten input. As seen the figure, the reconstructed strokes approximate the original strokes in the handwritten input quite well.

Thus, once an alphabet 19 has been derived for representing handwritten Chinese characters, any handwritten Chinese input can be represented at output 76 in a compact fashion using the symbols of the alphabet. This output can be used to generate stored templates described below.

Note that this alphabet is used only to represent handwritten Chinese characters (for storage in a computer memory, for instance), and not used while writing Chinese characters. Users can continue to handwritten Chinese characters in the usual way, with no knowledge whatsoever of the underlying alphabet that is used to represent the characters.

Figure 10:
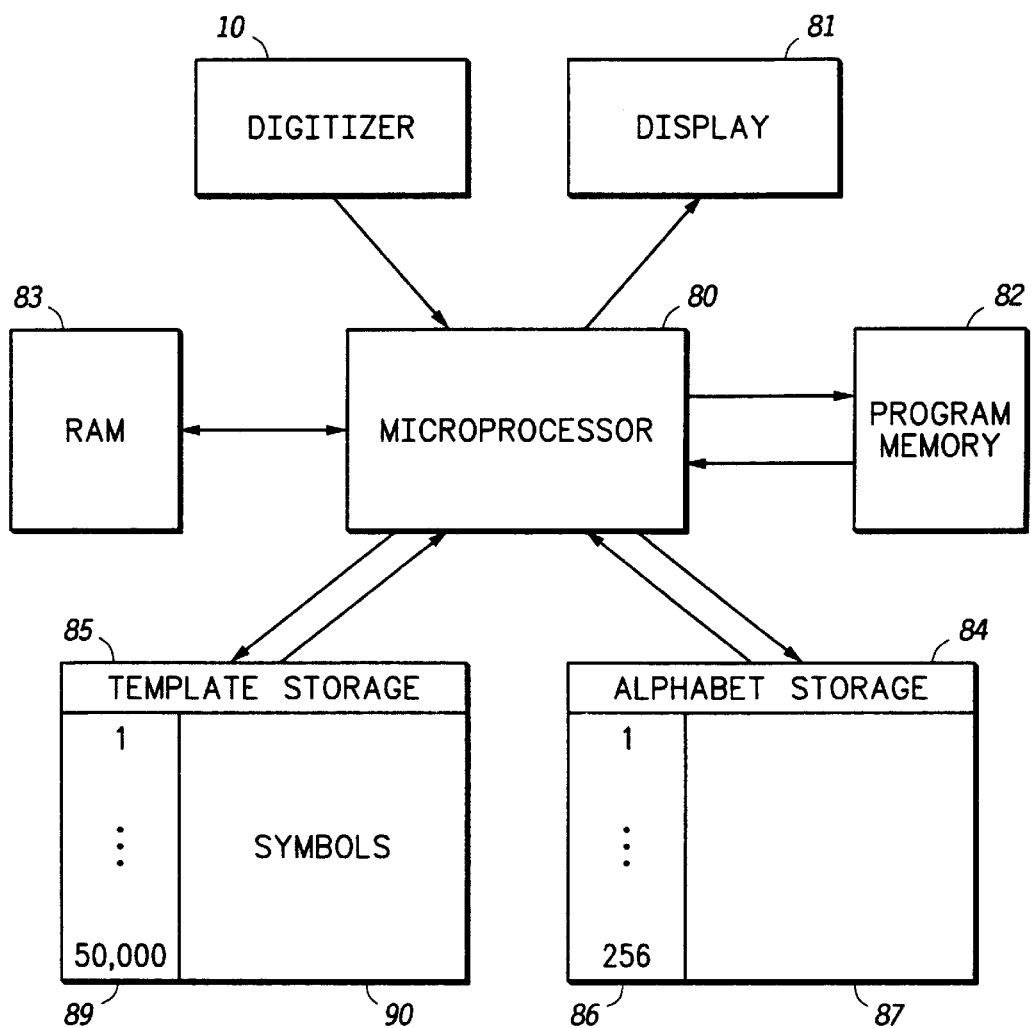
FIG. 10 is a block diagram of a device for handwriting recognition.

A device for handwriting recognition is now described with reference to FIG. 10. The device comprises a digitizer 10, a microprocessor 80, a display 81, a program memory 82, a random access memory 83, an alphabet storage memory 84 and a template storage memory 85.

Alphabet storage memory 84 stores the symbol numbers 86 of the 256 (or other number) of symbols and the corresponding angle and length data 87 as illustrated in Tables 1 and 2.

Template storage memory 85 stores a large number of predefined character templates. The templates for each character of interest can be obtained by statistical analysis of a large number of handwritten character samples. Several templates are stored for each character to account for variations in writing. Typically memory 85 stores about 50,000 templates representing 13,052 different Chinese characters. The templates are already quantized according to the predefined alphabet and each has a template number in column 89 and is represented by a sequence of symbol numbers in array 90 (typically from one to eight symbols per template). This is a very compact way of storing such a large number of templates.

Figure 11:
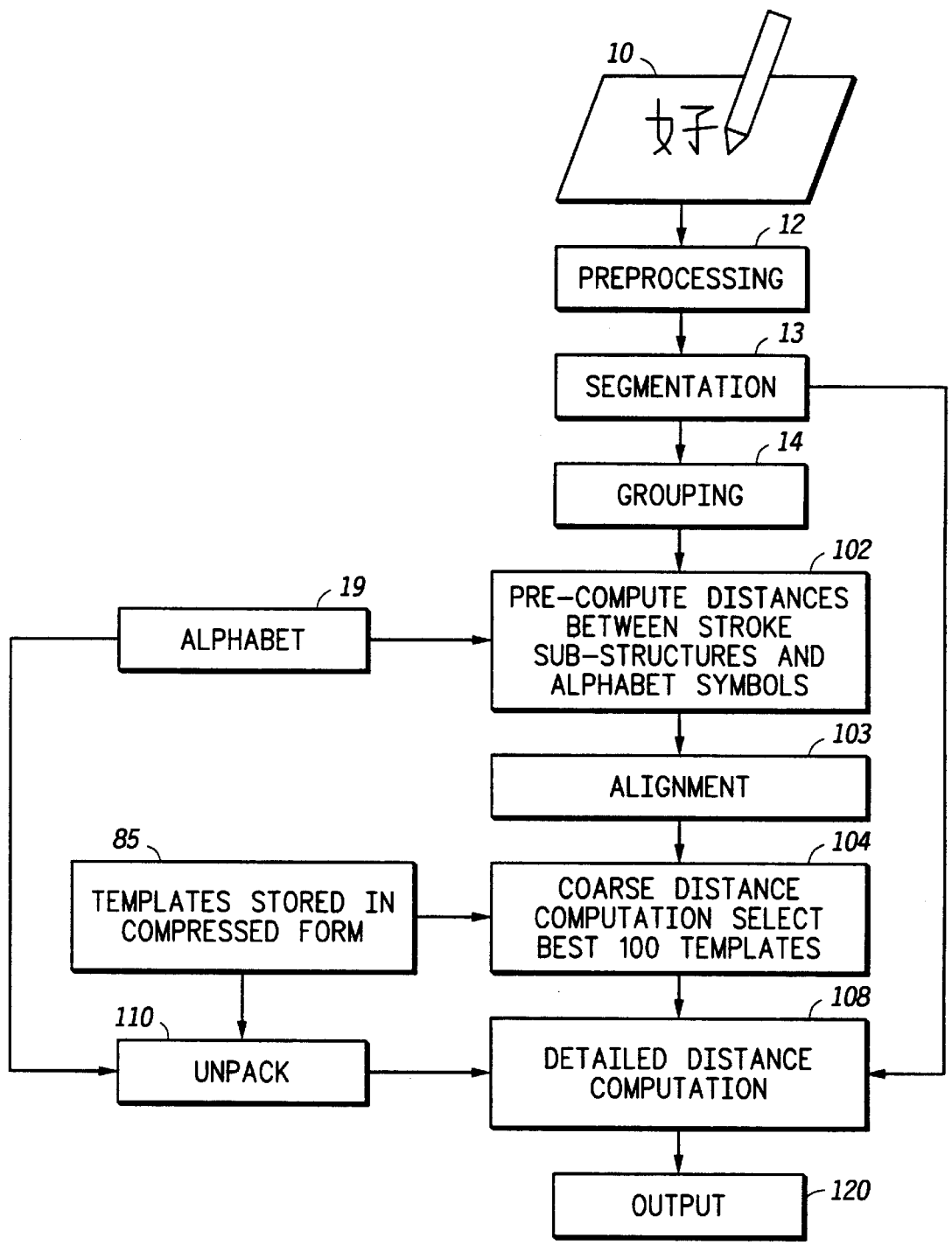
FIG. 11 is a flow diagram of a handwriting recognition process in accordance with a preferred embodiment of the invention, using the alphabet derived in the process of FIG. 1.

A block diagram showing the steps performed by microprocessor 80 in recognizing a handwritten Chinese character in terms of the derived alphabet is shown in FIG. 11.

Handwritten input is collected on digitizer 10, preprocessed and segmented into stroke sub-structures in steps 12, 13 and 14 in exactly the same way as in the processes described earlier, with a minor modification of the grouping step 14 which is described below. Recognition of the handwriting follows grouping step 14 beginning with a precomputing step 102.

In pre-computing step 102, distances between stroke sub-structures and alphabet symbols are computed. The distance between each of the input stroke sub-structures and each of the 256 symbols of the alphabet is computed using the a metric similar to the one given in Equation 1 above, and stored in a table in RAM 83.

Following the precomputing step, an alignment step 103 is performed. In this step a correspondence or alignment is found between the stroke sub-structures in the handwritten input and symbols of the alphabet in a string that represents a template. Alignment is necessary since the number of stroke sub-structures in the handwritten input and the number of symbols in the string representation of the template may be unequal. A computationally inexpensive technique for alignment is linear alignment.

Figure 12:
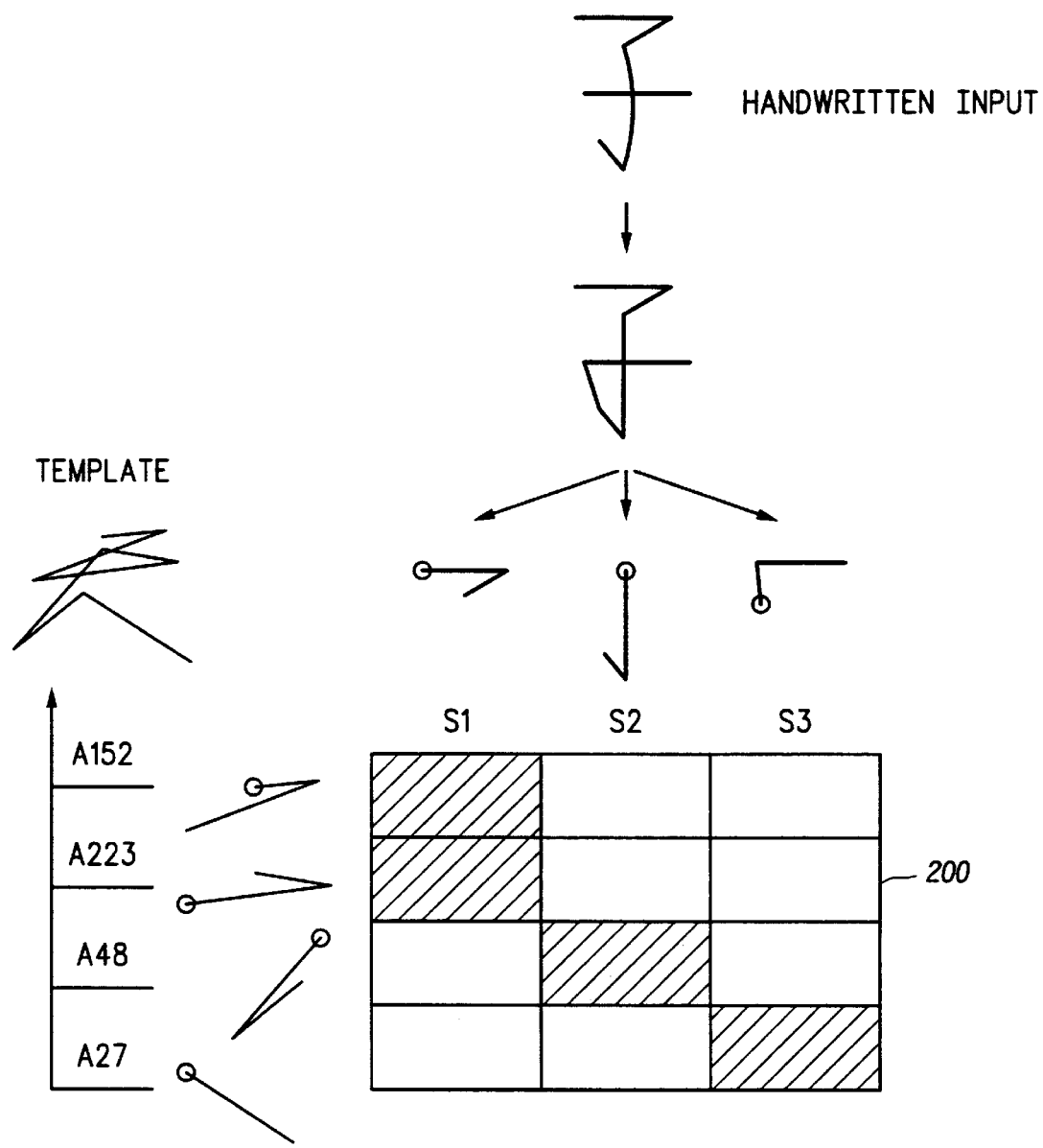
FIG. 12 is an illustration of a handwritten character undergoing an alignment step of FIG. 11.

An example of linear alignment is shown in FIG. 12, in which a handwritten input which is decomposed into three stroke sub-structures S1, S2, and S3, is compared with a template whose string representation is {A152, A223, A48, A27}. The template has four symbols in its string representation, while the input has only three stroke sub-structures. The purpose of alignment is to find for each stroke sub-structure in the handwritten input, a corresponding symbol in the string representation of the template. If the stroke sub-structures are presented along an upper side of a matrix 200, and the symbols in the string representation of the template are presented along a vertical side of the matrix, then the diagonal of the matrix gives the required linear alignment. In FIG. 12, the shaded boxes show the linear alignment. Thus, symbol A152 aligns with stroke sub-structure S1, symbol A223 aligns with stroke sub-structure S1, symbol A48 aligns with stroke sub-structure S2, and finally, symbol A27 aligns with stroke sub-structure S3.

Following the step of alignment 103 in FIG. 11, a coarse distance computation is performed in step 104 to select a "best set" of candidate templates, for example 100 candidates, from template storage 85. This is in effect a fast-matching step.

The grouping step 14 of FIG. 11 is modified slightly from the grouping step 14 of FIGS. 1 and 8 in that a window of comparison for stroke sub-structures is established including, where present, at least one stroke (and preferably two strokes) in front of a stroke sub-structure of interest and one stroke (but preferably two strokes) following the stroke sub-structure of interest. Distance measurements are computed for stroke sub-structures within the window. This is illustrated by the groupings 49 and 50 of FIG. 3 which are, respectively, examples of groupings one stroke ahead of and one stroke behind the sub-structure 47. In step 104 these groupings will also be used to select the best candidate list of templates.

In the fast matching step, the (unquantized) handwritten input is compared with each of the stored templates and a coarse distance is computed. The purpose of fast matching is produce a small list of likely character identities that match the handwritten input without doing a large amount of computation. For example, in the case of the traditional Chinese character set which has 13052 characters, the fast matching module could produce a list as small as 100 characters.

The coarse distance is computed in step 104 using the pre-computed distances between stroke sub-structures and alphabet symbols from the table generated in step 102 (stored in RAM 83) and by performing a coarse distance computation to select a "best set" of candidate characters for a set of character templates stored in memory 85. Referring to FIG. 12 the fast matching distance is $$d_{fastmatch}=d_T(S1, A252)+d_T(S1, A223)+d_T(S2, A48)+d_T(S3, A27) \quad (EQ\ 2)$$

In the above equation, $d_T(Si, Aj)$ is the distance between stroke sub-structure Si and the symbol Aj. Note that $d_T(.,.)$ is pre-computed and stored in the table in RAM 83 for all stroke sub-structures in the handwritten input and all symbols of the alphabet. Thus, the fast matching distance can be computed very efficiently with very little computation. The purpose of fast matching is to produce a small list of likely character identities that match the handwritten input.

Using the candidate character templates, a detailed distance computation (a nearest neighbor classifier) is carried out in step 108 using the raw segments from step 13.

The detailed distance computation can be carried out in a manner known in the art, for example as described in U.S. Pat. No. 5,742,705 of Parthasarathy and incorporated herein by reference. For the purposes of the detailed distance computation, the templates from memory 85 are unpacked in step 110. The detailed matching module computes a detailed matching distance between the handwritten input and the stored templates for each of the characters in the list produced by the fast matching module.

The detailed matching module computes a detailed matching distance between the handwritten input and the stored templates for each of the characters in the list produced by the fast matching module. Since the templates are stored in a compressed form, each template has to be "unpacked" before it can be compared with the handwritten input. Recall that templates are stored as a string of symbols of the alphabet. Unpacking is a process where the actual stroke models corresponding to each symbol in the string are accessed and concatenated. After unpacking, a template is represented as a sequence of strokes, where a stroke is a straight line segment, and is compared to the sequence of strokes in the handwritten input. Detailed matching distance can computed in several ways. One technique is to use a method similar to Dynamic Time Warping used in speech recognition (see H. Sakoe, S. Chiba. "Dynamic Programming Algorithm Optimization for Spoken Word Recognition." Readings in Speech Recognition, A. Waibel and K-F. Lee, editors. Morgan Kaufmann, San Mateo, Calif., USA. 1990).

In this manner, the detailed (and slow) computation 108 is made very mush faster by presenting only a candidate list of, for example, 100 possible templates out of the total of (typically) 50,000 templates stored in memory 84. Problems prevalent in prior art use of a nearest neighbor classifiers are thus greatly alleviated by storing the templates in a compact form using the derived alphabet described in the earlier sections.

The identity of the stored template that has the least distance to the handwritten input is reported as the identity of the handwritten input at output 120. Alternatively a candidate list of, say, the top 10 matches can be displayed on display 81 for the user to pick the desired character.

What is claimed is:

1. A method of recognizing handwriting comprising the steps of:

receiving a pen input comprising one or more alphanumeric symbols;

determining the maximum number of segments that an alphanumeric symbol may have;

segmenting the pen input into strokes at significant bends in the pen input;

preprocessing the strokes to enable cursive forms of writing and print forms of writing to be handled in the same manner;

grouping the strokes into stroke substructures; and computing distance and angle measurements between the input stroke substructures and members and members of a predefined set of strokes and primitive stroke substructures.

2. The method of claim 1 wherein the primitive stroke substructures comprise between 2 and 4 straight line strokes.

3. The method of claim 1 further comprising storing a set of templates, each template comprising stroke sub-structures selected from the predefined set of stroke sub-structures.

4. The method of claim 1 further comprising:

storing a set of templates, each template comprising stroke substructures selected from the predefined set of stroke substructures; and computing distance measurements between input stroke substructures and stroke sub-structures of a template.

5. The method of claim 3, wherein the stroke substructures of each template are quantized according to the predefined set of stroke substructures.

6. The method of claim 4 further comprising selecting, from the set of templates, a selected subset of templates dependent on the step of computing distance measurements, where the templates of the selected subset provide lower distance measurements with respect to the stroke substructures that other templates not included in the selected subset.

7. The method of claim 6 further comprising using the selected subset of templates for recognition of the pen input.

8. The method of claim 7 further comprising performing distance computations between templates of the selected subset of templates and the pen input to establish at least one template most closely matching the pen input.

9. The method of claim 7, wherein the step of computing distance measurements includes a relatively coarse distance computation and the step of using the selected subset of templates includes a relatively fine distance computation.

10. The method of claim 7 further comprising unpacking the templates of the selected subset into unpacked data defining strokes of the stroke sub-structures and matching the pen input with the unpacked data.

11. The method of claim 3, further comprising establishing a window of comparison for stroke sub-structures including, where present, at least one stroke in front of a stroke sub-structure to be compared and one stroke following the stroke sub-structure to be compared and computing distance measurements for stroke sub-structures within the window.

12. A method of providing an alphabet of sub-strokes for handwriting recognition comprising:

collecting pen input from a plurality of writers of a selected language;

determining the maximum number of segments that an alphanumeric symbol may have;

identifying segmentation points in the pen input that are at significant bends in the pen input;

segmenting the pen input at the segmentation points into strokes and stroke sub-structures;

parameterizing the strokes and stroke substructures to provide stroke parameters;

establishing an alphabet size;

deriving an alphabet of a first set of strokes and at least a second set of stoke sub-structures, by clustering the strokes and stroke sub-structures and averaging stroke parameters across samples in a cluster, where the total number of elements in the sets is equal to the alphabet size; and introducing during a preprocessing procedure any required artificial strokes to correspond to pen motion to enable cursive forms of writing to be handled the same way as print forms of writing.

13. The method according to claim 12, further comprising generating cluster centers.

14. The method according to claim 13, further comprising storing the cluster centers in terms of parameters defining the cluster centers.

15. A device for handwriting recognition comprising:

a memory having instructions and data stored therein that, when executed cause a digital processor to comprise:

a pen stroke information input;

a segmenter and grouper coupled to the input, having a stroke and stroke sub-structure output;

a processor to preprocess the strokes to enable cursive forms of handwriting and print forms of handwriting to be handled in the same manner the process further for determining the maximum number of segments that an alphanumeric symbol may have;

a template store having stored therein templates quantized according to a predefined alphabet of strokes and stroke substructures; and a quantizer operative on the segmenter and grouper to compute distance and angle measurements between parameters of strokes and stroke sub-structures of the stroke and stroke sub-structure output and parameters of strokes and stroke sub-structures of templates in the template store and thereby to select at least one template.

16. A device according to claim 15, wherein the memory further has instructions and data stored therein that, when executed cause a digital processor to comprise a predefined set of stroke sub-structures, and cause the quantizer to accept sub-structures of the predefined set as input.

17. A method of recognizing handwriting comprising the steps of:

receiving a pen input;

segmenting the input into parameterized straight-line strokes at significant bends in the pen input;

preprocessing the strokes to enable cursive and print character entry to be handled in the same manner;

determining the maximum number of segments that an alphanumeric symbol may have;

grouping the straight-line strokes into input stroke sub-structures comprising combinations of straight-line strokes; and computing distance and angle measurements between parameters of the input stroke sub-structures and corresponding parameters of members of a predefined set of strokes and primitive stroke sub-structures.

18. The method of claim 17, wherein the step of grouping includes grouping straight-line strokes that span a pen-up event into straight-line stroke sub-structures.

* * * * *

UNITED STATES PATENT AND TRADEMARK OFFICE
CERTIFICATE OF CORRECTION

PATENT NO.   : 6,275,611 B1                                          Page 1 of 1
DATED        : August 14, 2001
INVENTOR(S)  : Parthasarathy, Kannan It is certified that error appears in the above-identified patent and that said Letters Patent is hereby corrected as shown below:

Claim 1,
Line 14, delete "and members" following substructures

Claim 12,
Line 15, change "stoke" to -- stroke --

Signed and Sealed this

Sixteenth Day of April, 2002

Attest:

JAMES E. ROGAN
Attesting Officer    Director of the United States Patent and Trademark Office